Aug. 8, 1950 P. B. LAESER 2,517,891

METHOD AND APPARATUS FOR SATELLITE BROADCASTING

Filed Feb. 10, 1945

INVENTOR
PHILLIP B. LAESER
BY
Wheeler, Wheeler & Wheeler
ATTORNEYS.

Patented Aug. 8, 1950 2,517,891

UNITED STATES PATENT OFFICE 2,517,891

METHOD AND APPARATUS FOR SATELLITE BROADCASTING

Phillip B. Laeser, Wauwatosa, Wis., assignor to The Journal Company, Milwaukee, Wis., a corporation of Wisconsin Application February 10, 1945, Serial No. 577,199

18 Claims. (Cl. 250—15)

This invention relates to improvements in method and apparatus for satellite broadcasting.

While the principles herein disclosed may be used in so-called repeater broadcasting stations, it is a primary object of the invention to provide improved service for shadowed zones in the service area of a broadcasting station and particularly such a station as broadcasts at high frequency.

More or less arbitrarily, the primary service area of a broadcasting station is one in which a 1000 microvolt signal is or should be received. For high frequency broadcasting, particularly as represented in the FM field, the outer limits of the service area of the broadcasting station are defined by field intensities within the 50 microvolt contour. Within the service areas, there may be existing zones known as shadows and in which obstructions, such as hills, cliffs, or buildings may introduce attenuation to the point where adequate signals cannot be received from the transmitter. Such a condition presents a serious problem, especially if a shadow falls inside the primary service area. For example, suppose the primary service area is cut by a deep valley. Reception from the transmitter may be perfect on the cliffs at either side, but may be wholly lacking in the thickly populated valley between.

A practical method of servicing shadow areas is by the use of booster or satellite stations, of which there are three main types.

The operation of an independent transmitter on a frequency other than that assigned to the main station requires the use of two channels. One disadvantage is the loss of frequency identification due to the use of dual channels. Another disadvantage lies in the fact that the maximum number of channels available for primary service is reduced if one station has to use two channels to secure proper coverage.

The operation of a satellite transmitter using the same program on the same channel as that used by the primary transmitter but without synchronization, causes a zone between the areas served by the main transmitter and the areas served by the satellite transmitter in which there is objectionable interference at points where the signals approach equal intensity. Such interference is particularly noticeable during program pauses and at times of zero modulation. It may be evidenced by loss of clearness in the signals received or by a beat note of a frequency representing a difference between the two carriers or by the presence of standing waves which cause a re-enforcement or neutralization of the signal at that point. Such an arrangement is very undesirable unless the booster or satellite transmitter is so placed that this zone falls in an area having relatively few potential listeners.

The present invention relates to a station of the third type, in which the satellite station depends on the main transmitter for both carrier and modulation, and the broadcasting from the satellite transmitter is in complete synchronism with the broadcast from the primary transmitter. Specifically, it is my purpose to assure the necessary synchronism, while, at the same time, permitting adequate reamplification at the satellite station of the signal received from the primary transmitter.

Other objects of the invention will be apparent to those skilled in the art upon analysis of the following disclosure of the invention.

In the drawing.

Like parts are designated by the same reference characters throughout the several views.

Figure 1:
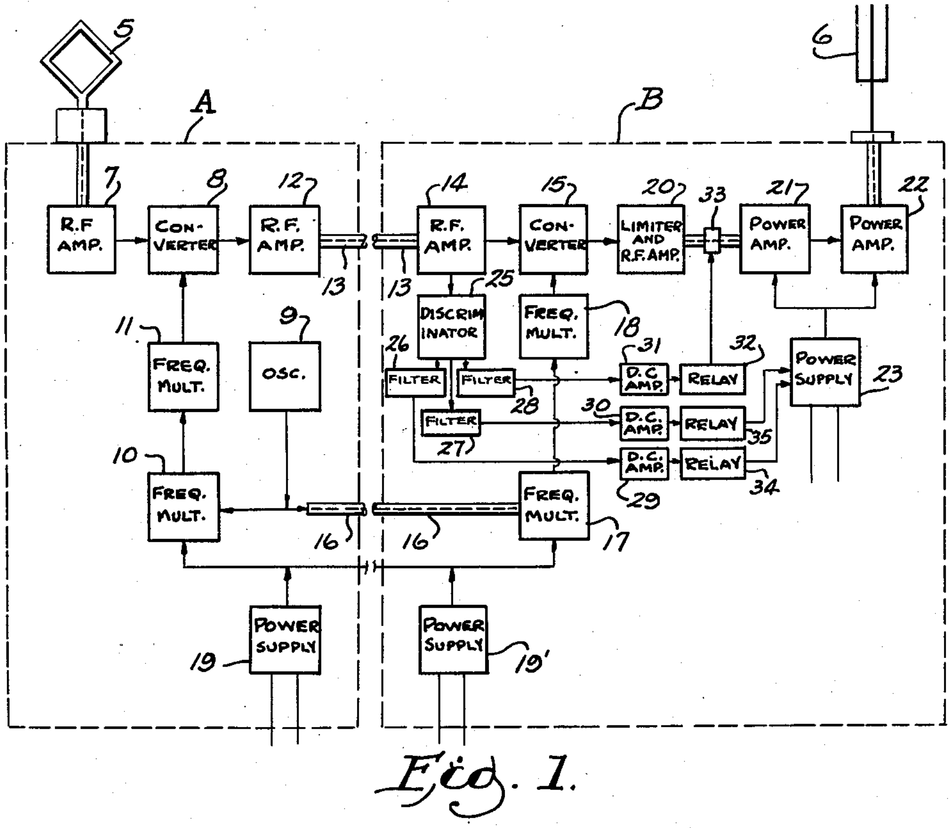
Fig. 1 is a diagram illustrating the disposition and connection of component pieces of apparatus in an assembly for practice of the invention.
Figure 2:
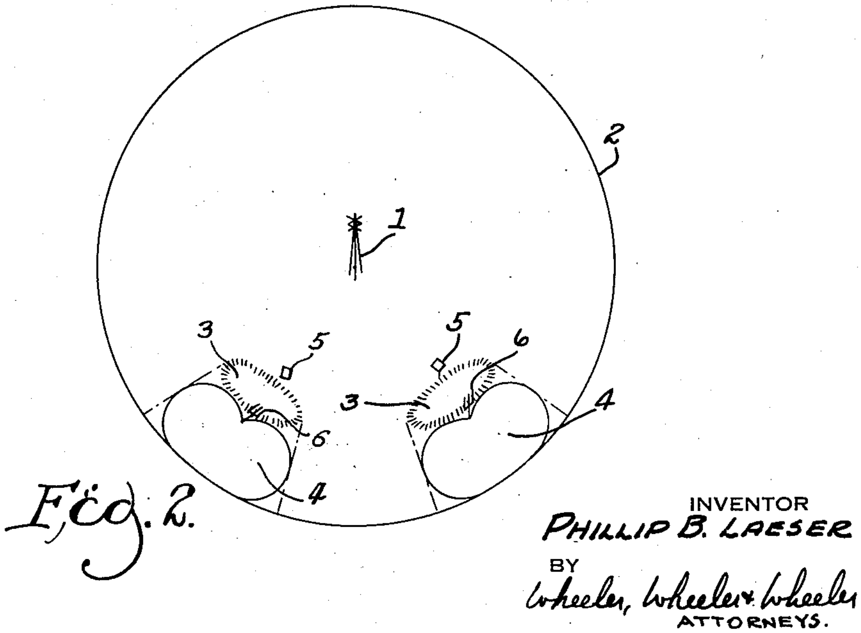
Fig. 2 is a plan view diagrammatically illustrating the service areas covered through the use of the invention.

Referring first to Fig. 2, I have illustrated at 1 a primary broadcasting transmitter which may be assumed, for the purpose of this disclosure, to be broadcasting an FM signal on a carrier frequency of 45.5 megacycles. It will, of course, be understood that all values stated are solely by way of example.

The circle 2 represents the hypothetical limit of the service area of the transmitter 1. However, let it be assumed that at 3 there is a hill or other natural or artificial screen creating at the side of such hill remote from the transmitter 1, a zone 4 of shadow extending outwardly from the hill and roughly lying between radii drawn from the transmitter 1 and passing at either side of the screen 3. In accordance with the present invention, a satellite station receiving antenna is disposed at 5 and a satellite station broadcasting antenna at 6. Preferably the antennae chosen and their relation to each other and the screen 3 (which preferably intervenes between them) are carefully chosen to make the respective antennae of the satellite as highly directive as possible, the receiving antenna 5 being highly directive for reception from the direction of the primary transmitter 1 and the satellite transmitting antenna 6 being beamed to cover as completely as possible the zone 4 which lies in shadow so far as the primary transmitter 1 is concerned. The principles involved in the beaming of the receiving and transmitting antennae are well known.

The present invention is not concerned with the manner in which the result is achieved. So long as the combined rejection ratio as between the two satellite antennae is adequate, it is immaterial whether the discrimination is obtained by natural barriers or mechanically, electrically, or otherwise.

In actual practice, the receiving unit A and the satellite transmitting unit B will ordinarily be separated by a considerable distance (not at all critical) which, for experimental purposes, was taken at 400 to 500 feet. The signal induced in the antenna 5, with or without amplification at 7, is introduced into a converter 8 where it is heterodyned by another frequency by which a beat frequency is created at the output of converter 8. The oscillator 9 generates this frequency which, for purposes of illustration, may be assumed to be 4.4 megacycles. This frequency is passed through the frequency multipliers 10 and 11, in each of which the frequency is tripled so that the resulting frequency fed to the converter 8 from the oscillator 9 is nine times the original, or 39.6 megacycles.

The mixing of two frequencies results in beat notes representing the sum and the difference of such frequencies. The radio frequency amplifier 12 is adjusted to be tuned to one of the beat notes. For example, the radio frequency amplifier 12 may be assumed to be tuned to the beat note representing the difference between the received frequency of 45.5 megacycles and the stepped up oscillator frequency of 39.6 megacycles. In other words, the radio frequency amplifier 12 is tuned to pass a band of frequencies which includes the beat note of 5.9 megacycles.

The reason for changing the received frequency is because so extremely high a frequency as 45.5 megacycles cannot be amplified to advantage. The beat note frequency of 5.9 megacycles can readily be amplified to any desired degree with relatively fewer stages.

In practice, at least one stage of amplification for the beat frequency is contained within the receiving unit A. The output of amplifier 12 is then connected by coaxial cable 13, preferably underground, to the satellite transmitting unit B where it may be further amplified in amplifier 14, which passes it to another converter unit 15.

A signal from the oscillator 9 not only passes through frequency multipliers 10 and 11 but is also connected by the coaxial cable 16, preferably underground, to frequency multipliers 17 and 18 in the transmitting unit B. The respective units may have their own independent power supplies at 19 and 19', if desired, to save communicating wire.

Since the frequency multipliers 17 and 18 are identical to those shown at 10 and 11, and since both sets are fed from the same source at 9, the output of frequency multiplier 18 will be identical in frequency with the output of frequency multiplier 11. On the basis of the assumed figures, the output from the multiplier 18 will be 39.6 megacycles. When the injection frequency of 39.6 megacycles is mixed in the converter 15 with the amplified frequency of 5.9 megacycles, it will again develop beat notes representing the sum and the difference of the respective frequencies. The amplifier 20 is tuned to accept only the beat note representing the sum of the amplified frequency of 5.9 megacycles and the injected frequency of 39.9 megacycles. This sum is the identical frequency of the signal originally received at 45.5 megacycles. The amplifier 20 preferably includes not merely amplification mechanism but also limiting apparatus which becomes saturated when the signals are excessively strong and thus reduces all signals to the desired level at which the weakest signal can be properly amplified for retransmission. From the amplifier 20 the signal preferably passes to the power amplifiers 21 and 22 which may be separately powered from a supply source 23. From the output amplifier 22 the signal passes to the satellite transmitting antenna 6 for rebroadcasting Throughout its passage through the apparatus, as herein disclosed, the signal will retain its original modulation. Since a single oscillator at 9 serves to provide the beat frequency in both of the converters 8 and 15, it will be apparent that the carrier frequency as well as the modulation will be provided by the primary transmitter. Within the limits of the capacity of the band-pass R. F. amplifiers, no amount of wandering of the oscillator 9 can affect this result. The signal broadcast from the satellite antenna 6 will correspond in all respects with the exception of intensity with the signal broadcast from the primary antenna at 1. By amplifying the beat frequency which, in converter 8, is the difference between the incoming frequency and the injected frequency, and by amplifying at 20 the beat frequency produced in converter 15 which is the sum of the intermediate frequency and the injected frequency, I necessarily provide in converter 15 an inherent and automatic correction for any deviation occurring in converter 8. Whatever variation occurs in converter 8 is counteracted by an equal and opposite variation in converter 15 derived from the same source, namely, the oscillator 9. The oscillator 9 is preferably crystal controlled.

In practice, this system has been used in an installation in which the mutually screened antennae 5 and 6 are highly directional and have patterns resembling cardioids, the combined rejection ratio being in excess of 1000 times. The antennae consisted of horizontal dipoles with a copper baffle screen directly back of each. A 100-watt output was used to feed the satellite antenna 6.

The results were so excellent that it was difficult to locate the zone of degraded service between the field served by the satellite antenna 6 and the field served by the primary antenna 1. Comparative tests were made using the same signal frequencies, power, and antenna systems, but with a non-synchronous setup and it was found that under those conditions the degraded zone was very apparent.

Using the satellite system as herein disclosed, audio frequency beat notes are completely eliminated. Even in the degraded zones, there was almost no audible distortion and this was probably attributable to the difference in time over the paths followed by the respective carrier waves. The degraded zone was found to be only a fraction of the width of the degraded zone noted when the transmitters were operated non-synchronously in the test above described.

Where the antennae 5 and 6 of the satellite station are properly screened either by reason of the natural topography or by reason of their mechanical-electrical design, the feed back from antenna 6 to antenna 5 will ordinarily be negligible and may not be detectable. However, in so far as feed back exists, it may become evident when the primary transmitter 1 is, for any reason, off the air. In order that the satellite station may function without attention, it may be desirable, under certain circumstances, to provide for the control of the satellite station from the primary station. This may be done by modulating the carrier wave at the primary station with some super-audible control frequency which should be sufficiently high so that it is not only super-audible per se, but will not tend to develop an audible beat frequency. For example, this control frequency may lie above 25,000 cycles. It is estimated that the control frequency with which the carrier is modulated for control purposes need not, in practice, require more than twenty per cent modulation of the carrier wave, more or less. In operative electrical connection with a portion of the circuit in which the signal frequency is present, for example R. F. amplifier 14, I may provide at 25 a discriminator adapted to demodulate the frequencies with which the carrier wave is modulated.

A series of filters 26, 27, 28 may be used to select particular modulation frequencies and to pass these to the respective rectifiers and/or amplifiers 29, 30 and 31. Filter 28, for the purpose of the present disclosure, may be a band-pass filter which, for example, may pass frequencies in the band between 25,000 and 35,000 cycles. Any such frequency passed by the filter 28 and rectified and amplified at 31 will operate the relay 32 to close the switch 33 which, for purposes of illustration, is incorporated in the signal transmission line between amplifiers 20 and 21. It is the function of this switch to stop broadcasting from the satellite station whenever the control frequency modulation in the band between 25,000 and 35,000 cycles ceases to be received, either due to a failure of the carrier wave or to an interruption of the control modulation at the primary station. For this purpose the switch 33 may control either the power supply or the signal in any desired manner.

The filters 26 and 27 may be highly selective. By way of example, the filter 26 may be arranged to pass a frequency of 27,000 and the filter 27 a frequency of 33,000, both of such frequencies falling within the band passed by filter 28. The amplified frequencies passed by filters 26 and 27 will operate relays at 34 or 35 to control the functioning of the power supply 23 for the power amplifiers 21 and 22, whereby to regulate the power with which the satellite station broadcasts. This, again, is by way of example, for any other function of the satellite station could be similarly controlled. In the assumed example, if the super-audible control frequency impressed on the carrier wave at the primary station is 27,000 cycles, the satellite station may be made to broadcast at one power. If the impressed control frequency is 33,000 cycles, the satellite station will broadcast at a different power. As long as either control frequency is present in the modulation of the carrier wave from the primary broadcasting station, the satellite station will operate, but if neither control frequency is present, nor any other frequency in the band passed by the filter 28, the satellite station will go off the air.

As a result of this arrangement, the satellite station will automatically go off the air whenever the primary station does so but, in addition, any one of a number of satellite stations may, for any special reason selectively be put off the air by simply interrupting the control frequency in the control room of the primary broadcasting source.

If a number of satellite stations are to be thus controlled, it will, of course, be understood that the filters of the respective satellites will be made responsive to different frequencies or bands of frequencies. It will be obvious in the light of the foregoing disclosure that any single control frequency may be used to control any single function where a multiplicity of functions as herein disclosed is not required.

I claim:

1. The combination with a broadcasting station having a shadowed area within its service zone, of a rebroadcasting station of the type adapted to receive a given carrier wave and to rebroadcast a correspondingly modulated wave at the same frequency, and comprising a receiving antenna disposed within an unshadowed portion of said service zone and a directional rebroadcasting antenna having as its service zone substantially solely the shadowed portion of the zone first mentioned, the receiving antenna of said rebroadcasting station being connected with a first section comprising a heterodyne converter unit, means for injecting a heterodyning frequency into said converter unit for generating modulated subtractive beat frequencies therein, means for selectively amplifying said subtractive frequency, and a second section physically spaced bodily from the first section and comprising a second heterodyne converter unit operatively coupled electrically with the first section amplifying means to receive the selectively amplified subtractive beat frequency aforesaid, means for injecting a heterodyning frequency into the second converter unit for generating an additive beat frequency therein, and means for selectively amplifying and broadcasting said additive beat frequency, the said additive frequency being identical with the frequency broadcast by said first mentioned broadcasting station and means constituting a single frequency source communicating with the respective means of the separate sections for injecting heterodyning frequencies to the respective converter units, whereby any variation in the operation of said source will be self-compensating as between the respective units.

2. In a broadcasting system of the character described including a primary transmitter designed to service a predetermined area, the combination with a satellite transmitter arranged to service a shadowed portion of the same area, of a receiving antenna arranged to receive a signal from the primary transmitter, a first heterodyne converter and means leading from the receiving antenna for feeding a given carrier frequency thereto, a second heterodyne converter, an intervening amplifier operatively connected between the respective converters and adapted to amplify a selected beat note generated in the first converter and to deliver the amplified beat note to the second converter, a second amplifier operatively connected to the output of the second converter and adapted to amplify and deliver a selected beat note generated in the second converter, the amplifiers being tuned to amplify beat notes which are respectively additive and subtractive, a single source of heterodyning frequencies for the respective converters, and means including frequency multiplying means connecting said source with the converters for delivering identical frequencies from the single source to the converters, whereby, notwithstanding fluctuation in the frequency output of said source, the frequency amplified in the second amplifier will be the identical frequency received by the first converter, said satellite transmitter comprising means including a directional antenna for rebroadcasting the said signal from the second amplifier without substantial interference with the signal of the primary transmitter and substantially only to a portion of the service area of the primary transmitter not reached by the primary transmitter.

3. In a system of the character described, the combination with a primary broadcaster of modulated carrier frequencies to a predetermined zone, of means for receiving and rebroadcasting the identical modulated frequencies to a shadowed area in the same zone, said means comprising first and second heterodyne converters and means for feeding a modulated carrier frequency to the first converter, a single frequency generator provided with means operatively electrically connecting it with the said converters whereby identical frequencies from said single source are delivered to the converters, and carrier frequency amplifiers operatively connected to receive carrier beat frequencies from the respective converters, said amplifiers being tuned respectively to modulated carrier beat frequencies which are respectively the difference and the sum of the heterodyned frequencies in the respective converters, the first of said amplifiers being operatively connected between the first and second converters and the second of said amplifiers being provided with output connections for the delivery of an amplified modulated frequency identical in modulation with the carrier frequency received by the first of said converters, said receiving and rebroadcasting means comprising directional antenna screened from each other and including a rebroadcasting antenna beamed to the shadowed area of said zone and to substantially no unshadowed portion of said zone, whereby to preclude interference between the signal rebroadcast by said last mentioned antenna and the signal broadcast by said primary broadcaster.

4. In a remotely controlled broadcasting station, the combination with a receiving antenna and broadcasting means including a broadcasting antenna, of an amplifier having its input connected with the receiving antenna and adapted to amplify a modulated carrier wave received by the receiving antenna, a control for said broadcasting means, means for demodulating a modulation frequency of the carrier wave received by the receiving antenna and amplified by said amplifier, and means for delivering the demodulated frequency to said control for the operation thereof and the regulation of said broadcasting means, said last means comprising a circuit tuned to require the said control frequency to lie within a super-audible range having no audible beat note.

5. The combination set forth in claim 4, in which said broadcasting means include a power supply, and said control comprises at least one relay operatively connected to said power supply for the regulation thereof, a filter in operative connection with the relay for passing a particular frequency thereto for the operation of said relay, and a discriminator operatively connected to receive the modulated frequency described in claim 4 and operatively connected to deliver such frequency to said filter to be passed to said relay for the regulation of the power supply.

6. In a satellite broadcasting station including a carrier wave generator, a power amplifier and a broadcasting antenna, in combination with a receiving antenna for a modulated carrier wave and an amplifier in operative connection with said carrier wave generator for the modulation of the carrier wave generated in accordance with modulation of the carrier wave received, together with first and second controls for said power amplifier, the first control being determinative of the operativeness of the connection by which the generated carrier wave is modulated, and the second control being determinative of the power of said amplifier, relays in operative connection with the respective controls, filters connected with the respective relays, one of the filters being selectively tuned and the other being a band-pass filter having a range which is super-audible and so high that no frequency within such range has a beat note with the carrier wave which is audible, said range including the frequency to which the first relay is selectively tuned, a discriminator operatively connected to receive and demodulate a modulation frequency of the received carrier wave and operatively connected to deliver modulation component frequencies of the received carrier wave to the respective filters, whereby the presence or absence in the modulation of the received carrier wave of frequencies passed by the respective filters will operate the respective controls through the respective relays.

7. The combination set forth in claim 4, in which said broadcasting means includes a plurality of controls, two of which respectively control signal cutoff and signal power, relay means in operative connection with the respective controls, said means for delivering demodulated frequency including filter means tuned to pass control frequency modulation components of said carrier frequency for selectively operating one of said controls independently of the other.

8. The method herein disclosed, which comprises broadcasting a modulated carrier frequency to a given zone, receiving and heterodyning the modulated carrier frequency with an injected frequency, amplifying the modulated beat note resulting from such heterodyning, heterodyning the amplified beat note with the identical injected frequency, transmitting from the last mentioned heterodyning operation the modulated beat frequency which is identical to the original modulated frequency, and rebroadcasting the modulated beat frequency to a shadowed area within said zone and selectively excluding the rebroadcast from substantially all unshadowed portions of said zone, whereby to avoid interference with the broadcasting first mentioned.

9. The method herein described, which comprises broadcasting a modulated carrier frequency to a predetermined zone, receiving the broadcast modulated carrier frequency within said zone, heterodyning the received frequency with a given injected frequency to generate modulated beat frequencies, amplifying one of the modulated beat frequencies, heterodyning the amplified modulated beat frequency with the identical injected frequency thereby developing modulated beat frequencies, one of which is identical with the broadcast carrier frequency originally received, amplifying the modulated beat frequency which is identical with the carrier frequency originally received, and rebroadcasting and beaming for reception within the same zone the amplified modulated beat frequency last mentioned on the identical frequency of the received signal and in full synchronism therewith, while excluding the beamed rebroadcasting from substantially all portions of said zone except such as are shadowed to prevent access of the original broadcasting thereto.

10. The method set forth in claim 9 including the step of generating a frequency, multiplying the generated frequency and delivering the multiplied frequency from the single source for heterodyning the received frequency and the first beat frequency as set forth in claim 9.

11. The method set forth in claim 8, including the further steps of impressing a control modulation on the received carrier frequency, demodulating at least a control component of said modulation and controlling the transmission of the output beat frequency in accordance with said control component.

12. The method set forth in claim 9, in further combination with the steps of demodulating a modulating component of one of the modulated frequencies mentioned in claim 9, and regulating the rebroadcast aforesaid subject to the control of such modulated component.

13. A method of controlling a satellite broadcasting station from a primary broadcasting station, which method comprises broadcasting a carrier wave from the primary broadcasting station to a predetermined zone, modulating the carrier wave with a super-audible frequency as well as with audible frequencies, receiving and amplifying the modulated carrier wave at the satellite station, demodulating at the satellite station the super-audible frequency modulation of the carrier wave and broadcasting at the satellite station to a portion of the same zone a carrier wave with at least the audible frequency modulation of the original carrier wave, and controlling the broadcasting from the satellite station by said demodulated super-audible frequency.

14. A method of controlling a satellite broadcasting station from a primary broadcasting station, which method comprises the broadcasting of a carrier wave from the primary broadcasting station, modulating said carrier wave with a super-audible frequency as well as with audible frequencies, receiving, amplifying and rebroadcasting the modulated carrier wave at the satellite station, demodulating at the satellite station a component of the modulation of the carrier wave including the super-audible frequency impressed thereon, amplifying said super-audible frequency and operating a control of the rebroadcast of said carrier wave at the satellite station by the said amplified super-audible frequency.

15. The method set forth in claim 13, in which the carrier wave is modulated with a plurality of super-audible frequencies which are demodulated at said satellite station, and selectively applying at said satellite station the respective super-audible modulation components of the carrier wave there broadcast for the control of separate functions pertaining to the rebroadcast of such wave.

16. The method set forth in claim 13, which includes the modulation of the broadcast carrier wave with a plurality of super-audible frequencies, the demodulation, amplification and selection at the satellite station of such modulation frequencies as fall within a predetermined band, and effecting a first control of the broadcast from the satellite station in accordance with the presence or absence of any frequency within such band, and effecting a second control of the broadcast from said satellite station according to the presence or absence of a particular frequency in such band.

17. The herein described method of covering without interference a shadowed area in the service zone of a primary transmitter broadcasting a modulated carrier wave which comprises receiving the modulated carrier wave of the primary transmitter, generating an injection frequency, heterodyning the modulated carrier wave with said injection frequency, amplifying one of the resulting modulated beat frequencies, further heterodyning the amplified modulated beat frequency with the same identical injection frequency and amplifying and rebroadcasting to the said shadowed area that particular frequency resulting from such further heterodyning which is identical with the modulated carrier wave frequency originally heterodyned.

18. The method herein disclosed which comprises the broadcast reception of a modulated carrier wave of high frequency, generating an injection frequency, heterodyning the received modulated carrier wave with the injection frequency, amplifying the lower of the resulting modulated beat frequencies, conducting the amplified modulated beat frequency to another point by wire, conducting by wire the identical said injection frequency to such other point, heterodyning the amplified modulated beat frequency at such other point with the injection frequency conducted to such other point, and amplifying and rebroadcasting from such other point the modulated beat frequency resulting from said second heterodyning step and which is identical with the frequency of the carrier wave originally received, the rebroadcasting from such other point being beamed to a shadowed area within the general zone of broadcast reception of the carrier wave first mentioned and screened from substantially all unshadowed portions of said zone.

PHILLIP B. LAESER.

REFERENCES CITED

The following references are of record in the file of this patent:

UNITED STATES PATENTS

| Number | Name | Date |
|---|---|---|
| 1,881,483 | Gillett | Oct. 11, 1932 |
| 1,918,291 | Schroter | July 18, 1933 |
| 1,939,345 | Gerth et al. | Dec. 12, 1933 |
| 1,994,288 | Scheibell | Mar. 12, 1935 |
| 2,028,857 | Zworykin | Jan. 28, 1936 |
| 2,106,806 | Latimer et al. | Feb. 1, 1938 |
| 2,140,730 | Batchelor | Dec. 20, 1938 |
| 2,281,982 | Leyn | May 5, 1942 |
| 2,287,044 | Kroger | June 23, 1942 |
| 2,345,951 | Smith | Apr. 4, 1944 |
| 2,369,268 | Trevor | Feb. 13, 1945 |
| 2,401,333 | Bumstead | June 4, 1946 |
| 2,458,124 | Wilmotte | Jan. 4, 1949 |

FOREIGN PATENTS

| Number | Country | Date |
|---|---|---|
| 373,919 | Great Britain | June 2, 1932 |

OTHER REFERENCES

British Columbia's Broadcast Relay System, Electronics, September 1944, pages 92 to 97 and 304.

A Remote-Controlled Radio-Frequency Booster for a Broadcast Station, Proceedings of I. R. E., vol. 32, No. 9, September 1944, pages 525 to 533.